United States Patent [19]

Khosropour

[11] 4,388,091

[45] Jun. 14, 1983

[54] AIR CLEANER HAVING A DUST DUMPING VALVE

[75] Inventor: Mostafa M. Khosropour, Madison, Wis.

[73] Assignee: Nelson Industries, Inc., Stoughton, Wis.

[21] Appl. No.: 287,888

[22] Filed: Jul. 29, 1981

[51] Int. Cl.³ .................... B01D 45/12; B01D 46/48; B01D 50/00
[52] U.S. Cl. ........................................ 55/337; 55/391; 55/394; 55/426; 55/432; 55/466
[58] Field of Search ................ 55/337, 325, 391, 394, 55/395, 423, 426, 432, 466; 137/854

[56] References Cited

U.S. PATENT DOCUMENTS

| | | | |
|---|---|---|---|
| 3,268,018 | 8/1966 | Neilson | 137/854 |
| 3,633,613 | 1/1972 | Julow | 137/854 |
| 3,672,130 | 6/1972 | Sullivan et al. | 55/337 |
| 3,796,026 | 3/1974 | Mugford | 55/466 |
| 3,816,982 | 6/1974 | Regnault | 55/432 |
| 4,127,396 | 11/1978 | Tortorici et al. | 55/426 |
| 4,155,359 | 5/1979 | Zagorski | 55/432 |
| 4,261,710 | 4/1981 | Sullivan | 55/337 |

FOREIGN PATENT DOCUMENTS

| | | | |
|---|---|---|---|
| 1361437 | 4/1964 | France | 55/337 |
| 1378936 | 12/1974 | United Kingdom | 55/432 |

Primary Examiner—David L. Lacey
Attorney, Agent, or Firm—Andrus, Sceales, Starke & Sawall

[57] ABSTRACT

An air cleaner for an internal combustion engine, having a dust dumping valve. The air cleaner includes an outer housing containing a filter element and air is introduced into the housing and swirled outwardly before passing through the filter element for discharge. The heavier dust particles in the air are moved under centrifugal force to the inner surface of the housing and are discharged through a conical outlet in the lower end of the housing to a dust trap. The lower end of the trap is provided with a plurality of openings which are enclosed by a flexible rubber-like disc. When the engine is operating, the engine vacuum will draw the disc tightly against the openings to prevent the entrance of air into the trap. The weight of the dust collected in the trap in combination with the engine vibration will intermittently cause the rubber disc to drop away from the openings to discharge a portion of the collected dust. On stopping of the engine, the weight of the collected dust in the trap will open the disc valve to discharge the entire quantity of dust from the trap.

9 Claims, 5 Drawing Figures

AIR CLEANER HAVING A DUST DUMPING VALVE

BACKGROUND OF THE INVENTION

Air cleaners are normally used with internal combustion engines in off-road equipment, such as tractors, bulldozers and the like, to filter the air before it is drawn into the engine. With the use of off-road equipment, the air being drawn to the engine can contain substantial quantities of solid particles or dust, and it is desirable to separate the larger size dust particles from the air before the air is passed through the filter in the air cleaner in order to prevent premature clogging of the filter.

U.S. Pat. Nos. 3,319,404 and 3,429,108, show air cleaner constructions in which the air being drawn into the cleaner is initially swirled outwardly against the inner surface of the cleaner housing which serves to separate the larger solid particles or dust from the air stream. The air then flows through a central filter to the engine, while the separated particles are passed through an outlet tube in the lower end of the housing and are collected in a flexible rubber-like dust-dumping valve.

The valves, as disclosed in the aforementioned patents, are designed to collect and intermittently dump the dust. In general, the valves are constructed with an upper generally cylindrical portion, which acts as a trap to collect the dust, and the cylindrical portion terminates in a pair of lower lips which seal together under the influence of the engine vacuum.

With valves of this type, the weight of the dust collected in the trap, along with the engine vibration will intermittently cause the lips to open to dump or discharge a portion of the dust in the trap. On termination of engine operation, the weight of the dust will cause the lips to open to discharge the entire quantity of collected dust from the trap.

The lip-type dumping valves as used in the past have certain disadvantages. As the valves are normally installed in an exposed location, and as they are formed out of flexible rubber-like material, they are frequently subjected to damage. In addition, the continual exposure to weather can cause rapid deterioration of the rubber-like material.

It has also been found that the lip-type valves do not completely seal under the influence of the engine vacuum, with the result that small amounts of air are drawn through the valve into the air cleaner and this decreases the efficiency of the dust collection.

SUMMARY OF THE INVENTION

The invention relates to an improved air cleaner for an internal combustion engine having a dust collecting and dumping mechanism. In accordance with the invention, a transverse wall is spaced from an end wall of the air cleaner housing and divides the housing into a main filter chamber and an end chamber. The upper peripheral edge of the transverse wall has a cut-out or notch which provides communication between the two chambers. The lower end of the housing is provided with a generally conical outlet that straddles the transverse wall and the lower small diameter end of the outlet communicates with an enlarged diameter container or trap. Mounted on the lower end of the trap is a flexible pressure responsive valve which can take the form of a flexible rubber-like disc that is mounted flatwise against the bottom surface of the trap and encloses a plurality of openings in the bottom surface. During normal operation of the engine, the disc will be drawn tightly against the openings to seal the same.

During engine operation, the air being drawn to the cleaner will be swirled outwardly and the heavier dust particles will pass through the notch in the transverse wall into the end chamber and then through the conical outlet to the trap. Other dust particles having lesser inertia will be swirled against the inner surface of the transverse wall and can drop into the conical outlet for collection in the trap. This construction provides two separate routes for the passage of dust particles into the trap and thereby improves the efficiency of the air cleaner.

The weight of the dust collected in the trap, along with the engine vibration will intermittently cause the rubber-like disc valve to open, to thereby discharge a portion of the dust from the trap. When operation of the engine is terminated, the weight of the dust in the trap will open the disc-like valve to discharge the entire quantity of dust.

The construction of the invention has distinct advantages over air cleaners as used in the past. The dumping valve of the invention provides a positive seal during periods of engine operation. The engine vacuum will draw the rubber-like disc flatwise against the lower surface of the trap to completely close off the openings and prevent the entrance of air into the air cleaner. This greatly improves the air cleaner efficiency.

The conical outlet provides a relatively large dust collecting opening communicating with both the main filtering chamber and the end chamber, which aids in the collection of dust, while the lower, small diameter end of the conical outlet functions to prevent the dust within the trap from being drawn back into the air cleaner by virtue of the engine vacuum.

The air cleaner of the invention can also be readily adapted to aspirating muffler systems by merely connecting the lower end of the trap to the aspirating tube of the muffler. When used in an aspirating system, the disc-like valve serves a second function and operates as a check valve to prevent back flow through the air cleaner.

Other objects and advantages will appear in the course of the following description.

DESCRIPTION OF THE DRAWINGS

The drawings illustrate the best mode presently contemplated of carrying out the invention.

In the drawings:

FIG. 4 is a section taken along line 4—4 of FIG. 1; and

FIG. 5 is an enlarged fragmentary vertical section showing the dust dumping valve.

DESCRIPTION OF THE PREFERRED EMBODIMENT

Figure 1:
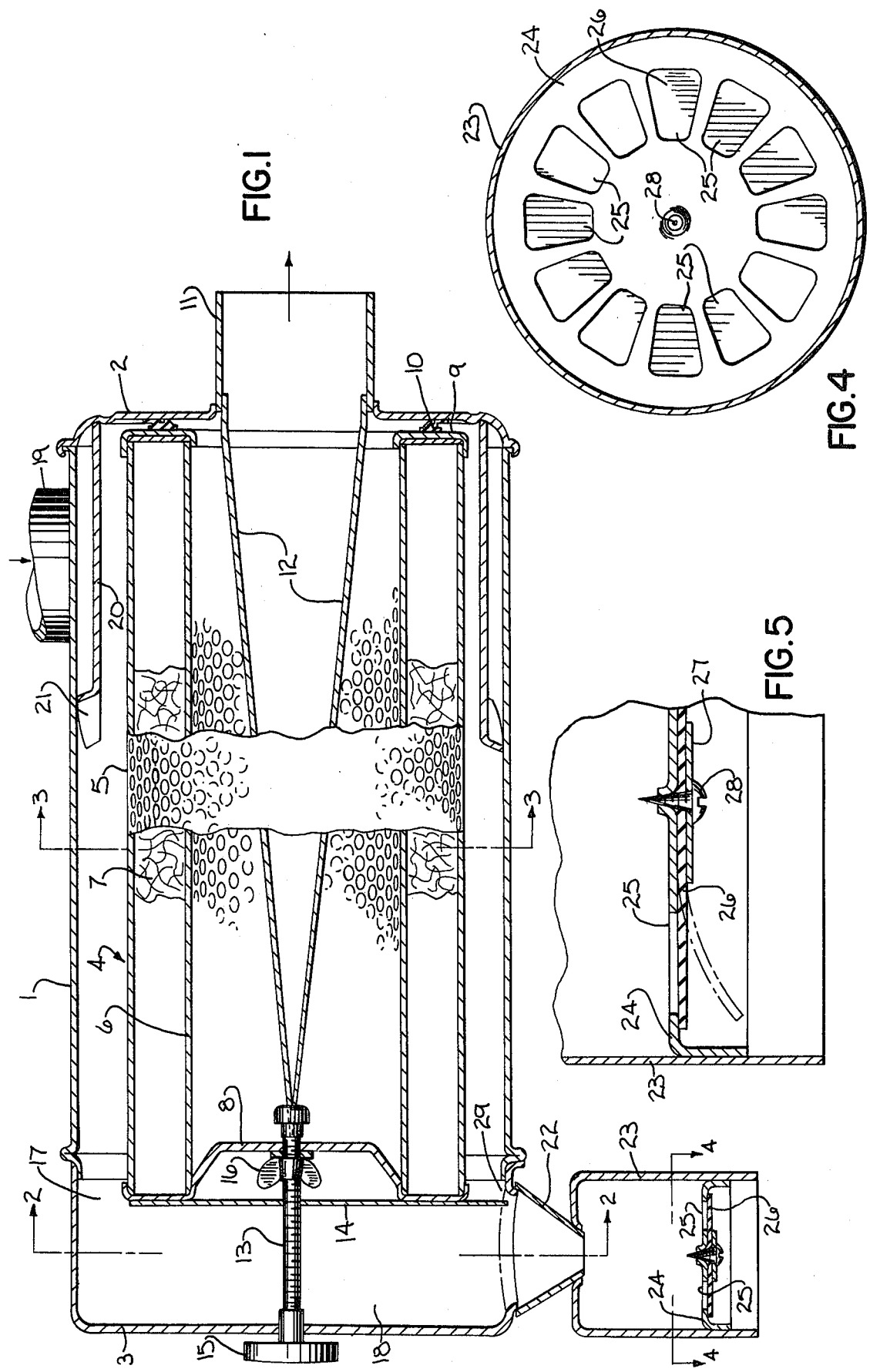
FIG. 1 is a vertical section of an air cleaner constructed in accordance with the invention.

The drawings illustrate an air cleaner for an internal combustion engine as used in off-road equipment, such as tractors, road graders, bulldozers, and the like.

The air cleaner includes an outer cylindrical casing 1 which is mounted horizontally and one end of the casing is enclosed by head 2 while the opposite end of the casing is enclosed by a cup-shaped head 3. Located within the casing is a filter assembly 4 which is composed of an outer perforated metal sleeve 5, an inner perforated metal sleeve 6 and an intermediate layer of fibrous filtering material 7. One end of the filter assembly 4 is connected to end member 8, while the opposite end of the filter assembly is secured to end ring 9 which is spaced from the head 2 by an annular resilient gasket 10.

An outlet tube 11 is secured within an opening in the head 2 and a plurality of braces 12 are connected to the outlet tube and extend within the open center of the filter assembly 4. As shown in FIG. 1, the converging ends of braces 12 are attached to the head of stud 13 which extends through aligned openings in the end member 8, the inner wall 14, and head 3. A cap 15 is threaded onto the outer end of the stud 13, while a wing nut 16 is threaded on the central portion of the stud and bears against the end member 8. By tightening down the nut 16, the filter assembly 4 will be brought into engagement with the head 2 to retain the filter assembly in proper alignment within the casing 1.

Figure 2:
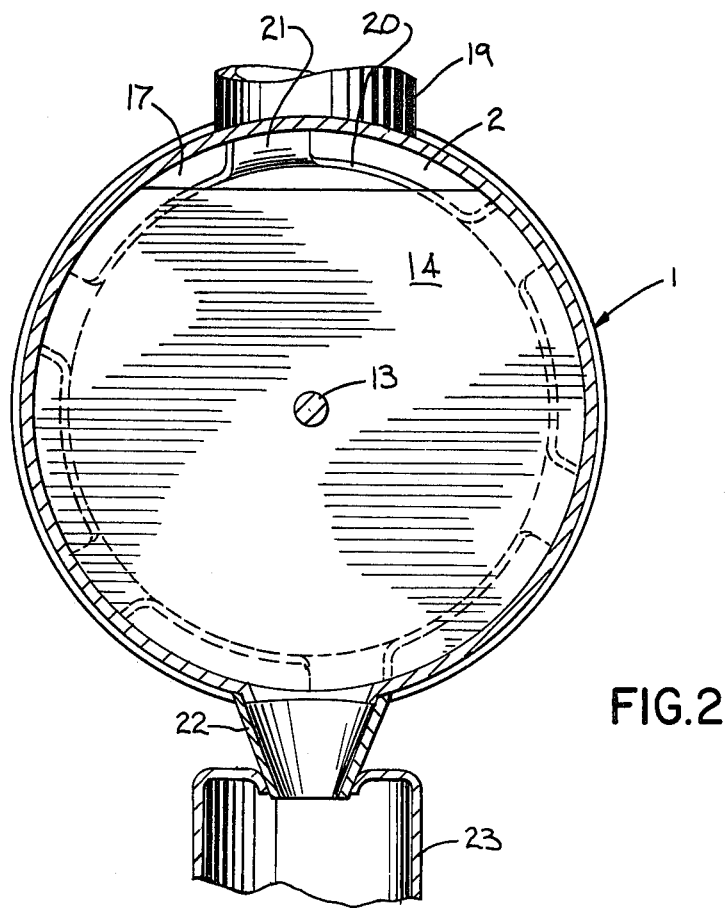
FIG. 2 is a section taken along line 2—2 of FIG. 1.
Figure 3:
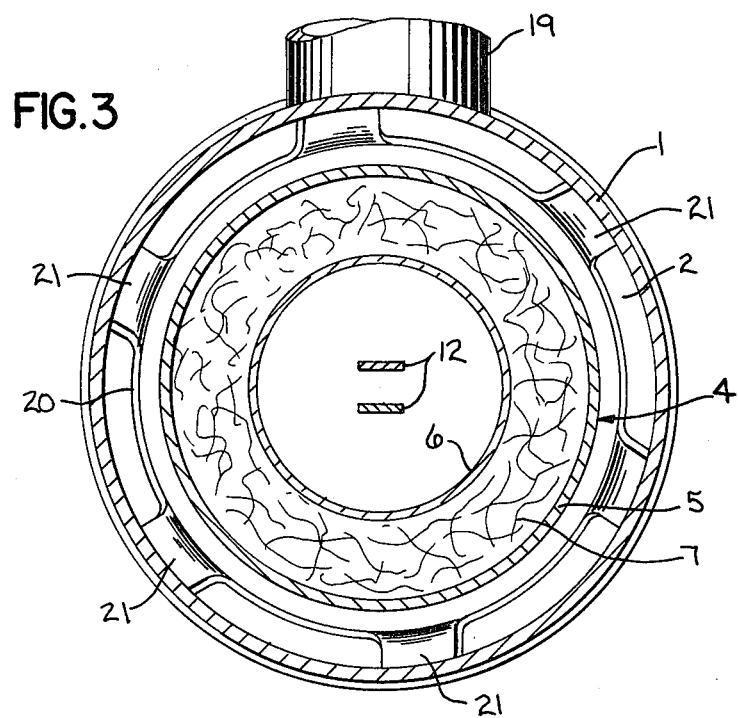
FIG. 3 is a section taken along line 3—3 of FIG. 1.

As best illustrated in FIG. 2, the edge of the wall 14 is cut away to provide a notch 17 which provides communication between the interior of the casing 1 and the chamber 18 defined by head 3 and wall 14.

Air is drawn into the casing 1 through an inlet tube 19 which extends through an opening in the upper portion of the casing 1, and the incoming air passes into the annular chamber defined by the casing 1 and annular wall 20. The air then flows through a series of louvers 21 which causes the air to swirl outwardly against the inner surface of the casing 1. The heavier dust particles in the air are thrown outwardly against the casing wall and pass through the notch 17 into the chamber 18, while the air containing the lighter particles passes radially inwardly through the filter assembly 4 and is discharged from the outlet 11 to the engine.

In accordance with the invention, a dust collecting and dumping assembly communicates with the lower end of the chamber 18, and the assembly includes a generally conical outlet 22 having a large diameter upper end which connects with chamber 18 and a small diameter lower end which is secured within an opening in the upper surface of a cup-shaped trap or container 23.

The lower end of the trap 23 is closed off by a flanged plate 24, and the plate is provided with a plurality of openings or holes 25 which are arranged in a generally circular pattern about the central axis of the plate. Mounted against the lower surface of the plate 24 is a flexible rubber-like disc or valve 26 which seals the openings 25. The disc valve 26 is mounted on the plate 25 by means of a washer 27 and screw 28.

The incoming air is swirled outwardly by the louvers 21 and the heavier dust particles will be thrown outwardly against the wall of the casing and pass through the notch 17 into the chamber 18, and then through the outlet 22 to the trap 23. In addition, some of the lighter weight particles will swirl outwardly against the inner surface of the wall 14 and, as the enlarged open end of the cone 22 extends to either side of the divider wall 14, the particles swirled outwardly against the wall 14 can drop through the gap 29 into the cone for collection in the trap 23. With this construction, two routes are provided for the entry of the dust particles into the cone-shaped outlet 22, one being through the chamber 18 and the second being through the space 29.

During operation of the engine, the engine vacuum will draw the rubber disc 26 tightly against the lower surface of the plate 24, closing off the openings 25 and preventing atmospheric air from entering the air cleaner through the trap 23. The weight of the dust collected in the trap 23, in combination with the vibration and pulsation of the engine, will intermittently cause the disc valve 26 to open, to thereby discharge a portion of the dust accumulated in the trap. This intermittent discharge of dust will occur during engine operation. When operation of the engine is terminated the weight of the dust will overcome the resiliency of the disc valve 26 to open the valve and permit all of the dust collected in the trap to be discharged. Thus, the valve of the invention provides for intermittent discharge of the collected dust during engine operation and complete discharge of the accumulated dust on termination of engine operation.

As the rubber-like valve 26 is located upwardly within the trap 23, it is in a protected position where it is not exposed to the elements and will not be accidentally damaged.

The valve 26 is adapted to seal flatwise against the lower surface of plate 24, completely closing off the openings and thus preventing the entrance of atmospheric air into the trap. By preventing the entry of air into the trap, the efficiency of the air cleaner is improved.

The air cleaner of the invention can be adapted to aspirating muffler systems by connecting a hose between the lower end of the trap 23 and the aspirating tube of the muffler. With a system of this type, the aspirating effect, during engine operation, will continuously hold the rubber valve 26 in the open position, but the valve will function as a check valve to prevent reverse flow through the trap 23 in the event of back flow or back fire of the engine.

The dust dumping valve assembly of the invention can be used with various types and configurations of air cleaners. As illustrated in the drawings, a single filter assembly 4 is utilized, but in other installations, multiple filter assemblies can be used. It is also contemplated that in certain air cleaners, the filter assembly can extend to a position adjacent the head 3, and in such cases, the internal wall 14 would be eliminated.

Various modes of carrying out the invention are contemplated as being within the scope of the following claims particularly pointing out and distinctly claiming the subject matter which is regarded as the invention.

I claim:

1. An air cleaner assembly for an internal combustion engine, comprising a housing having an air inlet and an air outlet adapted to communicate with the engine, filter means disposed in the housing between the inlet and the outlet, an outlet tube disposed in the lower portion of the housing, said outlet tube having a generally frustoconical configuration and having a large diameter upper end communicating with said housing and a small diameter lower end, a dust collecting container communicating with the lower end of the outlet tube and having a substantially greater cross-sectional area than said lower end of the outlet tube, said container having a lower surface spaced below said small diameter lower end, said lower surface of said container having opening means, a flexible sheet-like valve member disposed flatwise against the underside of the lower surface of said container, said valve member disposed to close off said opening means during periods of engine operation, dust being collected in said container, said valve member being constructed to move to an open position by the weight of collected dust in the container to thereby permit the dust to be discharged through said opening means, said small diameter lower end minimizing the draw back of dust from said container into said housing by engine vacuum when said valve member is opened.

2. The air cleaner assembly of claim 1, and including a closed divider wall extending across said housing and dividing said housing into a first chamber and a second filtering chamber, said filter means disposed within the filtering chamber, said wall having a peripheral opening establishing communication between said chambers, the lower portion of said first chamber being connected to said outlet tube.

3. The air cleaning assembly of claim 2, wherein said peripheral opening is located at the upper end of the housing.

4. The air cleaner assembly of claim 2, wherein said divider wall extends vertically and the upper end of the outlet tube extends horizontally to either side of the lower end of the wall, whereby dust can enter said outlet tube from both of said chambers.

5. The air cleaner assembly of claim 1, wherein, said opening means comprises a plurality of circumferentially spaced ports, and said valve member is connected to said lower surface at a location disposed centrally of said circumferentially disposed ports.

6. The air cleaner assembly of claim 1, wherein the upper end of the container has an aperture and the lower end of the outlet tube is secured within the aperture.

7. An air cleaner assembly for an internal combustion engine, comprising a housing having an air inlet and an air outlet adapted to communicate with said engine, a filter disposed in the housing between the inlet and outlet, tubular outlet means disposed in the lower portion of the housing and having an upper end communicating with said housing and having a lower end, said upper end having a larger cross sectional area than said lower end, a dust collecting receptacle communicating with said lower end and including a bottom wall spaced beneath said lower end, said receptacle having a larger cross sectional area than the lower end of said tubular outlet means, said bottom wall having a plurality of circumferentially spaced dust discharge openings therein and spaced radially outward of the center of said wall, a flexible sheet-like valve member pivotally connected against the underside of the bottom wall and extending across said openings, a rigid disc disposed against the underside of said valve member, the periphery of said disc being disposed radially inward and adjacent said openings, said valve member being drawn tightly against the underside of said bottom wall by engine vacuum during periods of engine operation to seal the openings, a given depth of dust within said receptacle acting through the openings against the valve member to thereby pivot the valve member away from said underside to expose the openings and dump a quantity of dust from the openings, the smaller cross sectional area lower end minimizing the draw back of dust from said receptacle into said housing by engine vacuum when said valve member is opened.

8. The air cleaner assembly of claim 7, and including a vertical wall disposed in the housing and dividing said housing into a first chamber and a second filtering chamber, said filter disposed within the filtering chamber, said vertical wall intersecting the upper end of said tubular outlet means.

9. An air cleaner assembly for an internal combustion engine, comprising a housing, a divider wall disposed transversely across said housing and dividing said housing into a first chamber and a second filtering chamber, said housing having an air inlet communicating with said filtering chamber and having an air outlet communicating with said filtering chamber, said divider wall having a peripheral opening adjacent the housing wall providing communication between said chambers, a filter disposed within the filtering chamber, a tubular outlet member mounted within an aperture in the housing and spaced circumferentially from the peripheral opening in said divider wall, said tubular outlet member straddling said divider wall and communicating with both said first and second chambers, a dust collecting container communicating with the lower end of the tubular outlet member, dust dumping valve means connected to the lower end of the container and responsive to a given weight of dust collected in said container for opening the valve means and dumping a quantity of dust, and means disposed within said housing for swirling the air outwardly against the housing wall so that heavier weight dust particles are swirled outwardly within said filtering chamber and pass through said peripheral opening into said first chamber and then pass through said tubular outlet member into said dust collecting container and lighter weight dust particles are swirled against said divider wall and pass through said tubular outlet member into said dust collecting container.

* * * * *